United States Patent [19]
Hammer et al.

[11] 3,848,905
[45] Nov. 19, 1974

[54] HIGH PRESSURE FITTING
[75] Inventors: Victor S. Hammer, Glen Ellyn; Chester W. Brozek, Chicago, both of Ill.
[73] Assignee: Chicago Fittings Corporation, Broadview, Ill.
[22] Filed: Apr. 3, 1972
[21] Appl. No.: 240,533

[52] U.S. Cl.............. 285/286, 285/342, 285/348, 285/354
[51] Int. Cl............................................ F16l 13/02
[58] Field of Search.......... 285/34 L, 348, 354, 416, 285/341, 286, 347

[56] References Cited
UNITED STATES PATENTS

| | | | |
|---|---|---|---|
| 2,560,263 | 7/1951 | Wiegond et al.............. | 285/354 X |
| 2,816,472 | 12/1957 | Boughton..................... | 285/342 X |
| 3,074,747 | 1/1963 | Boughton..................... | 285/348 X |
| 3,140,107 | 7/1964 | Hynes.......................... | 285/348 X |
| 3,193,310 | 7/1965 | Hildner....................... | 285/354 X |
| 3,239,247 | 3/1966 | Pickert........................ | 285/348 |
| 3,476,414 | 11/1969 | Condrol...................... | 285/354 X |
| 3,488,072 | 1/1970 | Allen et al. ................. | 285/354 X |
| 3,684,322 | 8/1972 | Kotsakis...................... | 285/343 |
| 3,698,744 | 10/1972 | Bevington................... | 285/416 |

*Primary Examiner*—Dave W. Arola
*Attorney, Agent, or Firm*—Gomer W. Walters

[57] ABSTRACT

A fitting particularly adapted for use in fluid transmission systems subjected to very high internal pressures, extreme temperatures, vibration or other severe conditions to couple a fluid conducting member or tube to a coupling body and having a ferrule means snugly received and fixedly positioned upon the member and a sealing means which is snugly received upon a cylindrical portion of the ferrule means and brought adjacent an outwardly extending flange portion of the ferrule means. The ferrule means and sealing means are contained within an annular chamber formed when the coupling body is threadedly engaged by a coupling nut positioned on the member in such a manner that when the coupling nut is tightened, the sealing means is deformed within the annular chamber to completely fill the chamber and form a fluid-tight non-extruding seal. A ferrule means having a plurality of inward protrusions disposed above the circumference of its cylindrical portion or an interferring diameter to prevent accidental movement along the member prior to joining thereto. A method of making a fitting in which a ferrule means is snugly received upon the fluid conducting member, is moved a predetermined axial distance along the member by a setting means and is then joined to the member. A sealing means is placed over a portion of the ferrule means, and is deformed by tightening the coupling nut threadedly joined to the coupling body to fill and seal the annular chamber created by the coupling body and the coupling nut.

12 Claims, 10 Drawing Figures

3,848,905
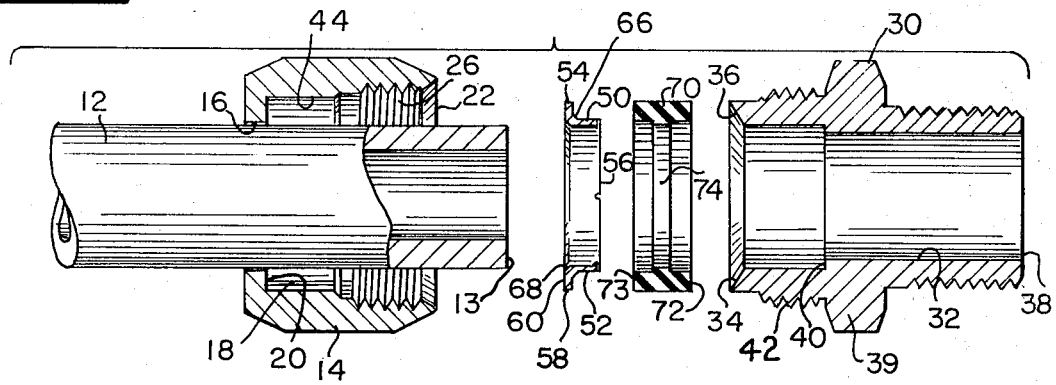
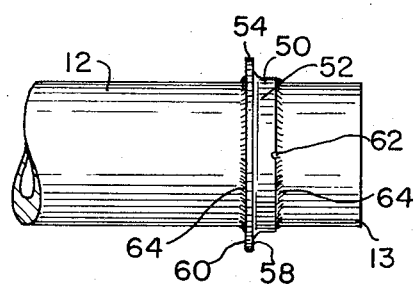
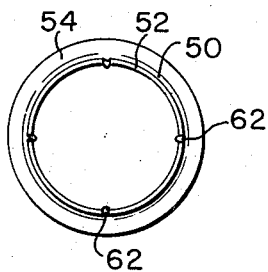
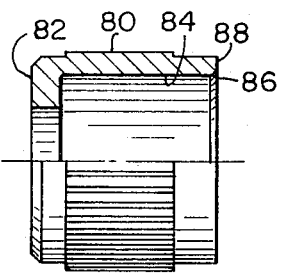
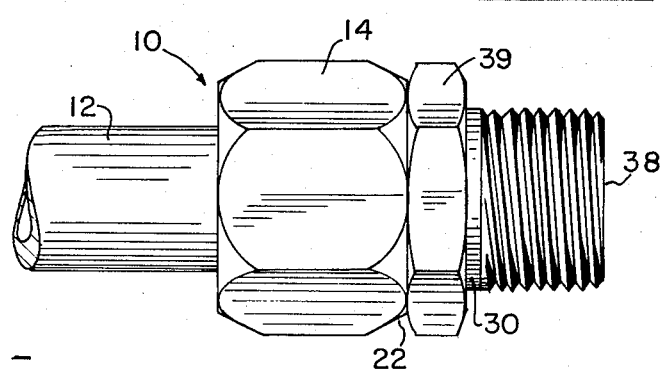

HIGH PRESSURE FITTING

BACKGROUND OF THE INVENTION

This invention relates to a fitting used in fluid transmission systems subject to extreme conditions of pressure and temperature, and, in particular, to a fitting for joining a fluid conducting member to a coupling body in which a portion of the fitting is fixedly joined to the member.

Reliable fittings are essential in any tubing installation or fluid transmission system subject to high internal pressure, extremes in temperature, or vibration. It has been found that ordinary fittings, such as those used in typical household installations, will not perform satisfactorily when subjected to these conditions. To obtain better performance, therefore, brazed fittings have been used in such high pressure installations. These brazed fittings, however, are often permanently and completely assembled as a result of the brazing and, therefore, preclude disassembly of the fitting at the job site, hampering easy workability or flexibility of the fitting when dealing with fixed end conduit installations. Another disadvantage of common brazed fittings is that the volume of brazing material required to form the fitting is not clearly defined, and, as a result, improper or leaky seals from the use of too much or too little brazing material are common.

Attempts have been made to overcome these problems of typical brazed fittings by techniques illustrated by U.S. Pat. No. 3,201,154 to Holmgren. Holmgren teaches a brazed fitting in which only a portion of the fitting is brazed to the tube prior to the joining of the tube to the coupling body, and in which a predetermined amount of brazing material is used. Though the fitting taught by Holmgren does provide a solution to some of the problems above, it still fails to provide the extremely reliable, leakproof form of fitting which is so vital in fluid transmission systems subject to extreme carrying requirements and environmental conditions.

The reason for this failure is that in a metal-to-metal joint, such as taught by Holmgren, if heating during brazing is not uniform, the brazing material either does not flow properly into the void between the sleeve and the tube and fails to form a seal, or the brazing material itself develops a porosity through small pin holes, which in high pressure installations provide leakage paths signifcant enough to be detrimetal to the system. Such leaks, of course, must be located and the fitting rebrazed or the fittings themselves taken apart and the brazed portions removed.

On the other hand, in prior art fittings which have used rubber seals in an attempt to avoid the problems of the metal-to-metal joint, such rubber seals, under the influence of high pressure or vacuum are often extruded through the passageways being sealed thereby damaging and/or destroying the effectiveness of the fitting.

SUMMARY OF THE INVENTION

This invention involves a novel fitting which provides for the reliable and effective joining of fluid conducting for the reliable and effective joining of fluid conducting members subject to extreme pressure, temperature and vibratory conditions. The apparatus of this invention and the method of making this apparatus achieves this reliability by using a positively located fitting having a metal-rubber-metal seal and providing the advantages of simpleness and easy workability found in the brazed joint in addition to the paramount advantage of reliability not previously obtainable.

This new and improved fitting and method of making it obtains these advantages by a ferrule means having a cylindrical portion which is formed itself or has a means formed thereon so that it may be snugly received over the end of the member to be coupled. This ferrule means has disposed at the inward or rearward end of its cylindrical portion, an outwardly extending flange having an outside diameter slightly less than the inside diameter of an enlarged portion of a coupling nut which has been previously positioned on the member. The ferrule means may have a plurality of inwardly protruding frictional retaining means such as nibs or knurls disposed about the circumference of its cylindrical portion. These nibs or knurls act to contact the surface of the member to be coupled so that the ferrule means may be moved axially rearward along the member only upon the application of an external force. They also act to temporarily maintain the ferrule means in the axial location to which it is moved. The ferrule means may also be split in its circumference to allow an interfering internal diamebTer to frictionally retain it on the member.

This fitting also includes a hollow sealing means or resilient ring which is placed over the end of the member to be coupled and snugly received upon the outside surface of the cylindrical portion of the ferrule means. This sealing means has a ridge or shoulder of like material integrally formed therewith and disposed about the interior circumference of a center portion of the ring. This shoulder abuts the forward edge of the cylindrical portion of the ferrule means. The radial width of the ring is generally the same as the radial width of the flange of the ferrule means which it abuts when the seal is formed. Therefore, in sealing, the rearward-facing surfaces of the resilient ring, from the innermost point on the shoulder of the ring to the outermost point on its rearward edge, generally lie adjacent the forward-facing surfaces of the ferrule means to insure a continuous seal.

In making the fitting of this invention, the ferrule means is first placed over the end of the member to be coupled. Then, using a cup-shaped setting means or tool described in more detail below, it is moved a predetermined axial distance along the member to an axial location on the member which has been determined by the sizes of the tubing in the system and the coupling nut and coupling body used. The ferrule means is then fixedly joined to the member by an appropriate and known method. In the preferred embodiment, brazing is used to fuse the ferrule means to the member, but it is clear that other joining means, such as epoxy resin, might be used as long as they are effective to firmly anchor the ferrule means to the member in a predetermined fixed position and thereby preclude axial movement or pullout of the fitting under the stresses to which the fitting may be subjected.

In fusing the ferrule means to the member by brazing, a conventional brazing ring may be placed over the end of the member and adjacent the forward end of the cylindrical portion of the ferrule means or a flattened brazing ring may be placed in a groove in the rearward end of the ferrule means. The ferrule means and brazing ring are then heated to the melting point temperature of the brazing material causing the brazing material to flow by gravity and/or capillary action into the void between the ferrule means and the outside surface of the fluid conducting member.

The resilient sealing means is then moved over the end of the member and placed adjacent the ferrule means, or if desired, placed so that the rearward surfaces of the sealing means abut the forward surfaces of the ferrule means. Such intimate positioning is not necessary, however, since the subsequent torquing of the coupling nut with respect to the coupling body will move the resilient sealing means into proper position for sealing.

The coupling nut has a straight bore to receive the tube or member therethrough and an interior transversely enlarged portion. It is placed over the end of the member prior to placing of the ferrule means, with the enlarged portion facing forward. After brazing and positioning of the sealing means, the coupling nut is moved into threaded engagement with the coupling body. When the coupling nut and coupling body are joined together, they define an interior annular chamber which surrounds the ferrule means and sealing means, and which has a diameter providing a close fit between the outside diameter of the sealing means and the inside diameter of the coupling nut.

The coupling nut is then tightened so that the rearwardly opening mouth of the coupling body urges the sealing means against the forward surfaces of the fixed ferrule means. Since these forward surfaces of the ferrule means resist this rearward movement, the sealing means or ring is deformed to completely fill the volume of the annular chamber and create a fluid-tight seal.

The rearward end of the enlarged interior portion of the coupling nut abuts or bottoms out on the rearward face of the flange portion of the ferrule means and the forward end of the nut bottoms on a gripping flange at the mid-portion of the coupling body to prevent overtightening and to properly compress the sealing ring. This bottoming out of the coupling nut on the ferrule means and gripping flange not only removes the need for tightening the nut to a predetermind torque but also prevents possible overtightening.

The ferrule means is preferably fabricated with a fillet between the cylindrical portion and the forward face of the flange portion, and the coupling body is fabricated with a frusto-conical mouth at its rearward end. The frusto-conical mouth abuts the sealing means during torquing and urges it against the ferrule means and the above fillet. The fillet and frusto-conical mouth produce a camming action on the sealing means to aid in deforming the sealing means to completely fill the volume of the annular chamber.

The unique construction and manufacture of the fitting of this invention provides several advantages. This fitting may be assembled on the job, which is of great importance when the member to be coupled is in a fixed position and/or located in a confined area. The ferrule means is merely placed on the member and will remain at the position at which it is placed until moved. The use of a resilient sealing means or ring formed of a high-density material eliminates the pin hole-type leak common in conventional metal-to-metal seals formed by the available brazed fittings. The use of the resilient sealing means is also advantageous in high pressure work since the material itself is not compressed within the annular chamber, but is merely deformed thereby maintaining a continuous sealing surface.

The brazing of the ferrule means to the fluid conducting member assures that the fitting will not be pulled from the end of the member under the influence of the severe temperature, pressure, or vibratory conditions which may be present. The outwardly extending flange, which forms a part of the ferrule means, also prevents extrusion of the sealing means under high pressure and thereby assures the maintenance of the resilient sealing means in an effective sealing position within the annular chamber.

Accordingly, it is an object of this invention to provide a fitting for use in fluid transmission systems and a method of making such fitting which assures a reliable, leakproof seal despite extreme conditions of pressure, temperature and vibration.

It is also an object of this invention to provide a fitting which is simple in construction.

It is a further object of this invention to provide a fitting and a method of making such fitting which permits easy on-the-job assembly, disassembly and workability.

It is also a further object of this invention to provide a fitting and a method of making such fitting in which a portion of the fitting is joined to a fluid conducting member in such a manner that it acts to position and maintain the fitting on the member in a predetermined axial position, even under adverse conditions.

It is still one more object of this invention to provide a fitting and a method of making such fitting in which the elements of the fitting act in conjunction with one another to deform a resilient sealing means to create a fluid-tight seal while preventing extrusion of the sealing means.

It is also a further object of this invention to provide a fitting and a method of making such fitting in which a ferrule means is positioned on the member to be coupled at a predetermined axial distance from its end to assure a fluid-tight relationship of all components of the fitting upon tightening, to eliminate the necessity of tightening to a predetermined torque and to preclude overtightening.

It is still another object of this invention to provide a fitting and a method of making such fitting in which the ferrule means is provided with frictional retaining means to prevent its accidental movement on the fluid conducting member and to maintain it in proper axial postion, prior to joining to the member.

It is yet another object of this invention to provide a sealing means formed in such a manner that it acts in conjunction with a ferrule means to form an effective seal in a high pressure fluid transmission system.

It is a still further object of this invention to provide a fitting and method of making such fitting in which the ferrule is formed to prevent accidental extrusion of the sealing means under extreme conditions.

These and other important objects of this invention will become apparent from the following description taken in conjunction with the drawings illustrating the preferred embodiment wherein:

BRIEF DESCRIPTION OF THE DRAWINGS

FIG. 1 is a side elvational view of the completely assembled fitting according to this invention;

FIG. 2 is an exploded cross-sectional view of the fitting shown in FIG. 1;

FIG. 3 is a cross-sectional view of the assembled fitting shown in FIG. 1;

FIG. 4 is a side elevational view of the sub-assembly of the fitting shown in FIG. 1 in which the ferrule means is joined to the fluid conducting member by brazing;

FIG. 5 is an end elevational view of the ferrule means shown in FIG. 4;

FIG. 6 is a side view partly in elevation and partly in cross section of a setting means according to this invention;

DETAILED DESCRIPTION OF THE PREFERRED EMBODIMENTS

Figure 8:
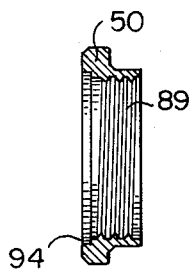
FIG. 8 is a side cross-sectional view of the ferrule means shown in FIG. 7.
Figure 7:
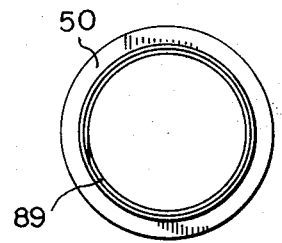
FIG. 7 is an end elevational view of a second embodiment of the ferrule means of this invention.

Referring now to the drawings and, in particular, to FIG. 1, the high pressure fitting of this invention is shown generally at 10. This fitting 10 includes a fluid conducting member or tube 12 of a type commonly used in fluid transmission systems subjected to extremes in pressure and/or temperature. Member 12 terminates in an end 13 which is to be coupled to a coupling body 30.

A coupling nut 14, having a straight bore 16 therethrough of slightly larger interior diameter than the outside diameter of the fluid conducting member 12 is disposed over the member 12. This coupling nut 14 has an inner transversely enlarged portion 18, as shown in FIG. 2, having an annular shoulder 20 at its rearward end and a series of female threads 26 about the interior circumference of its forward end.

Forward, as used with respect to this invention, refers to that directed toward the right-hand side of the drawings, while rearward refers to the opposite direction.

The fluid conducting member 12 is to be joined to coupling body 30. This coupling body 30 has a generally cylindrically-shaped passageway 32 formed therethrough. The rearward end 36 of passageway 32 of coupling body 30 opens in a frusto-conical mouth 34. In the preferred embodiment of this invention, this mouth 34 forms a predetermined forwardly extending angle with respect to the axis of a passageway 32 for reasons which will be explained in greater detail below. The mouth 34 of coupling body 30 has a diameter slightly larger than the outside diameter of fluid conducting member 12 so that fluid conducting member 12 may be inserted therein. Coupling body 30 has, near its mid-portion, an annular shoulder 40 disposed about its interior circumference and a gripping flange 39 disposed about its exterior circumference. The coupling body 30 also has, on its rearward outside surface, a series of external or male threads 42 adapted to threadedly engage the internal or female threads 26 disposed about the interior circumference of portion 18 of the coupling nut 14.

When external threads 42 engage internal threads 26 to join coupling body 30 to coupling nut 14, nut 14 and body 30 define an annular chamber 44 as shown in FIGS. 2 and 3. This annular chamber 44 is of such dimension that it receives within it a ferrule means 50 and a resilient sealing means or ring 70 which act in conjunction with the previously recited elements to form a fluid-tight, non-extruding seal.

The ferrule means 50 includes a hollow cylindrical portion or ring 52 as shown in greater detail in FIGS. 4 and 5. Ferrule means 50 also has an outwardly extending flange 54 which, in the preferred embodiments, is generally perpendicular to the surface of member 12 and disposed at the rearward end of portion 52. This flange 54 has a forward face or surface 58 and a rearward face 60. Ferrule means 50 also has a fillet 66 disposed between the forward face 58 of flange portion 54 and the outside surface of the cylindrical portion 52, and a chamfer 68 at the rearward end of the cylindrical portion 52.

Inwardly protruding frictional retaining means including a plurality of nibs 62 or knurls or threads 89 are formed at the forward end 56 of cylindrical portion 52 of ferrule means 50 as shown in FIGS. 4,5,7, and 8. These frictional retaining means 62 and 89 provide the ferrule means 50, with an interior dimension such that it is snugly received on the outside surface of member 12, and prevented from moving axially with respect to member 12 except on the application of an external force. These means 62 and 89 also act to maintain the ferrule means 50 in the axial location on the member 12 at which it is positioned by the external force applied to it.

Figure 10:
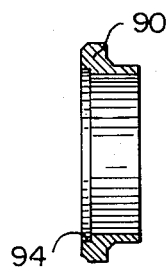
Figure 9:
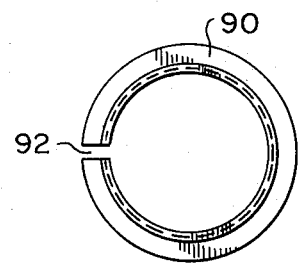
FIG. 9 is an end elevational view of a third embodiment of the ferrule means of this invention; and, FIG. 10 is a side cross-sectional view of the ferrule means shown in FIG. 9.

A third embodiment of the ferrule means is shown in FIGS. 9 and 10. In this modification, the ferrule means 90 is discontinuous or split at a point on its circumference by a gap 92. The interior dimension of the ferrule means is such that its interior diameter causes an interfering fit with member 12. By moving the ends of gap 92 apart, however, the ferrule means 90 may be sprung onto member 12 and frictionally retained thereon since ferrule means 90 will have a tendency to return to its original "gap" position.

The resilient sealing means or ring 70 is shown in FIG. 2. This hollow sealing means 70 is generally cylindrical in configuration and has an interior ridge or shoulder portion 74 disposed near its middle and running continuously about the circumference of the ring 70. The ring 70 has a forward edge or surface 72 and a rearward surface 73.

The sealing means or ring 70 has an internal diameter slightly larger than the exterior diameter of the cylindrical portion 52 of ferrule means 50 so that a rearward portion of the sealing means 70 is snugly received about the outside surface of the cylindrical portion 52 of ferrule means 50, as shown in FIG. 3. In this position, the rear edge of shoulder 74 of sealing means 70 abuts the forward end 56 of the cylindrical portion 52 of ferrule means 50.

The relationship of the above elements is such that when the coupling nut 14 is turned or tightened so that it is brought adjacent to the coupling body 30 as shown in FIG. 1, the sealing means 70 is deformed in conjunction with the ferrule means 50 so that it fills the volume of annular chamber 44 and forms a fluid-tight seal between fluid conducting member 12 and coupling body 30 and coupling nut 14. This fitting completely prevents rearward extrusion of sealing means 70 and substantially eliminates forward extrusion.

The unique method of making the fitting 10 of this invention first involves sliding coupling nut 14 over the end 13 of the member 12 so that the inner transversely enlarged portion 18 of coupling nut 14 is directed forwardly or toward end 13 of member 12.

In the preferred embodiment of this invention, shown in the drawings, the ferrule means 50 is brazed to member 12. To accomplish this, the external surface of member 12 is next coated with a flux material near its end 13. The ferrule means 50 is also coated with this flux material over its entire surface. The flux material merely serves to clean the surface of member 12 and ferrule means 50, free them from contaminats and reduce oxide buildup during heating.

Ferrule means 50 is then placed over the end to be coupled 13 of the member 12 with the flange portion 54 of ferrule means 50 facing rearward. A setting means or tool 80 is then placed over end 13 of member 12 and adjacent ferrule means 50. The setting means 80 is a cup-shaped tool formed from a tube folded over at one end to provide a bottom 82 and a hollow cylindrical interior portion 84 which opens in a mouth having a forward angled chamfer 86. The edge or lip 88 of the mouth is of such diameter that, when placed adjacent the ferrule means 50, it abuts the forward face 58 of the flange portion 54 of the ferrule means 50.

An external force is then applied to the bottom 82 of the cup-shaped setting means 80 by a hammer or other appropriate means. The force should be of such magnitude that it is sufficient to move the ferrule means 50 axially along the fluid conducting member 12 a distance equal to the axial dimension of the interior portion 84 of the setting means 80. This act requires no measurement since the interior face of the bottom 82 of the setting means 80 will seat itself on the end to be coupled 13 of the member 12 after ferrule means 50 has been driven the required distance. Setting tool 80 is also self-centering, with respect to member 12 and ferrule means 50, since fillet 66 and chamfer 86 act to center edge 88 of tool 80 directly on forward face 58 of flange 54 of ferrule means 50.

The ferrule means 50 is thereby sbt at a predetermined axial location on the member 12. This axial location will vary as the dimensions of the conducting member 12, the coupling nut 14 and the coupling body 30 vary but will always be at a point on the member such that the forward end 22 of nut 14 will bottom out on a gripping flange 39 of body 30, the annular shoulder 20 of nut 14 will bottom out on the rearward face 60 of flange portion 54 of ferrule means 50, and the volume of the annular chamber 44 formed between coupling nut 14 and coupling body 30 will equal and be occupied by the volume of the sealing means 70.

The setting means 80 is then removed from the member 12 and a conventionally-shaped ring of brazing material (not shown) is slid over the end 13 of member 12 and placed adjacent the forward end 56 of ferrule means 50. A rear facing groove 94 may also be provided in the interior circumference of the modified forms of the ferrule means shown in FIGS. 8 and 10. A flattened pre-formed brazing ring is then used and placed on member 12 prior to the ferrule means and then inserted into groove 94. The brazing ring is then heated evenly and uniformly at a temperature sufficient to cause the brazing material to melt and flow into the small void or space between the inside surface of the ferrule means 50 and the outside surface of member 12, thereby fusing the ferrule means 50 to the member 12. As has been stated, the ferrule means 50 and the fluid conducting member 12 may be joined to one another by any other appropriate means, such as epoxy resin, which would be equally effective to provide the necessary shear strength to withstand the stresses to which the fluid transmission system is subjected.

The resilient sealing means or ring 70 is then slid over end 13 of member 12 and placed adjacent the ferrule means 50. The coupling nut 14 and the coupling body 30 are moved toward one another until the male threads 42 on the coupling body 30 engage the female threads 26 disposed about the interior circumference of the coupling nut 14. The coupling body 30 may then be held in a relatively constant position by a wrench or other holding means while the coupling nut 14 is tightened with respect to coupling body 30 by a wrench or other appropriate means according to methods well known.

Significantly, the coupling nut 14 cannot be overtightened and the person assembling the fitting does not have to be concerned with the application of any predetermined or required torque to the fitting to assure a proper seal. These advantages result from the bottoming out of the forward end 22 of coupling nut 14 on the gripping flange 39 of coupling body 30, and of the annular shoulder 20 of the interior enlarged portion 18 of the coupling nut 14 on rearward face 60 of the flange portion 54 of ferrule means 50 as shown in FIGS. 1 and 3. When coupling nut 14 has been tightened so that shoulder 20 and forward edge 22 abut ferrule means 50 and coupling body 30 at the points described, the volume of the annular chamber 44 will equal the volume of the sealing means 70 so that the sealing means 70 will completely fill the annular chamber 44 forming a fluid-tight seal. Thus, no further tightening of the fitting is either necessary or possible to form a proper seal. These advantages allow this fitting to be assembled by unskilled personnel with simple equipment and a reliable fluidtight seal to always be obtained.

The conducting member, coupling nut and coupling body may be formed from any suitable materials which are strong, durable, capable of being formed or machined and resistant to the internal or external pressures and the changes in temperature and physical conditions to which the system may be subjected. Such materials will, therefore, vary according to these conditions and the uses of the system. Depending upon these conditions and uses, suitable material for the fluid conducting member might be steel or steel alloys, and for the coupling nut might be aluminum or steel. The coupling body, likewise, could be fabricated of aluminum or steel. The ferrule means may be formed from any suitable material which is strong, durable and capable of being firmly joined to the material of the fluid conducting member. Such materials would include metals such as steel, stainless steel and steel alloys.

The sealing means may be formed from any suitable high-density material which is incompressible and which may be easily molded in a desired shape, such as rubber.

The material used in forming the brazing ring in this preferred embodiment, or any material which will be used to join the ferrule means to the fluid conducting member, will depend upon the materials used in forming the fluid conducting member and the ferrule means. Such brazing material or other joining means, however, should be capable of joining the ferrule means to the fluid conducting member so that the junction will withstand the shearing stresses exerted on it. Alternatively, the junction should be resistant to the same stresses as the joined threads 26 and 42 shown in FIG. 2.

While this invention has been described in relation to a preferred embodiment thereof, it will be apparent to those skilled in the art that the structural details are capable of wide variation without departing from the principals of the invention. For example, the coupling body could be internally threaded and joined to an externally threaded gland which would act to push the coupling body toward the sealing means and the ferrule means. Even in such a case, however, the bodies would define an annular chamber and would still be precisely located by the positioning of the ferrule means joined to the fluid conducting member and would act in conjunction to deform the sealing means to form a fluid-tight seal. It is not intended that the illustrated embodiment, therefore, or the terminology employed in describing it be limiting. Rather, the scope of this invention should be restricted only by the scope of the appended claims.

We claim:

1. A fitting for joining a first member to a second member, which has a passageway therein to receive an insertion end and accompanying portion of the first member, comprising:
   ferrule means having a flange portion extending outwardly from the first member in a direction generally transverse to the axis of the first member and a sleeve portion conformed to the shape of the outer circumference of the first member and extending axially therealong, said flange portion being affixed to said sleeve portion at the end thereof furthermost from the insertion end of the first member, said ferrule means located on the outer surface of the first member, at a predetermined distance in the axial direction from the insertion end of the first member, and joined to the first member in such a fashion as to be fixedly anchored thereto at said predetermined distance from the insertion end of the first member;
   deformable sealing means positioned about the circumference of the first member between the insertion end thereof and said flange portion of said ferrule means;
   a coupling nut extending over said sealing means and said flange portion of said ferrule means, said coupling nut having a radially inwardly extending shoulder positioned with said flange portion of said ferrule means between said shoulder and the insertion end of the first member, and said coupling nut having threads formed on the inner circumference thereof adjacent the insertion end of the first member;
   threads formed on the external surface of the second member to mesh with said threads formed on said coupling nut;
   a sealing means engaging structure on the end of the second member through which the first member is inserted, meshing of said threads on said coupling nut and on the second member casuing said sealing means engaging structure to compress said sealing means against said flange portion of said ferrule means to form a fluid tight seal; and
   a fillet between said sleeve portion and said flange portion to aid in securing proper deformation of said sealing means by directing said sealing means outwardly along said flange portion to bear against the inner surface of said coupling nut to form a stronger radial seal.

2. A fitting as claimed in claim 1 and further comprising a gripping flange located on the external surface of the second member to contact the end of said coupling nut when the meshing of said threads has produced a desired amount of compression of said means, thereby preventing said ferrule means from being wholly or partially separated from the first member by excessive force resulting from meshing of said threads beyond a given amount.

3. A fitting as claimed in claim 1 wherein said ferrule means is brazed to the first member.

4. A fitting as claimed in claim 1 and further comprising frictional retaining means disposed about the internal circumference of said sleeve portion to prevent accidental movement of said ferrule means along the first member and to maintain said ferrule means at said predetermined distance from the insertion end of the first member.

5. A fitting as claimed in claim 4 wherein said frictional retaining means comprises a plurality of inwardly extending protrusions formed at the end of said sleeve portion of said ferrule means adjacent the insertion end of the first member.

6. A fitting as claimed in claim 4 wherein said frictional retaining means comprises a plurality of threads disposed about the internal circumference of said sleeve portion of said ferrule means.

7. A fitting as claimed in claim 1 wherein said sealing means engaging structure is a frusto-conical mouth on the end of the second member.

8. A fitting as claimed in claim 1 wherein said ferrule means is discontinuous at a point on its circumference and is formed with an interior diameter slightly less than the exterior diameter of the first member, such that said ferrule means may be snugly received upon the first member and frictionally retained thereon.

9. A pipe fitting to join a pipe to a coupling body, which has a passageway adapted to receive an insertion end and accompanying length of the pipe, the diameter of the passageway being only slightly greater than the external diameter of the pipe, comprising:
   a ferrule brazed to the pipe a predetermine distance from the insertion end thereof, said ferrule comprising a sleeve portion engaging the external surface of the pipe and a flange portion extending transversely to the axis of the pipe and affixed to said sleeve portion at the end of said sleeve portion farther from the insertion end of the pipe;
   frictional retaining means disposed about the internal circumference of said sleeve portion to maintain said ferrule at said predetermined distance from the insertion end of the pipe until it is brazed to the pipe;
   deformable sealing means positioned about the circumference of the pipe between said flange portion of said ferrule and the insertion end of the pipe;
   a coupling nut extending over a sealing means and said flange portion of said ferrule, said coupling nut having a radially inwardly extending shoulder positioned to abut the said of said flange portion away from the insertion end of the pipe;
   threads formed on the internal surface of said coupling nut adjacent the insertion end of the pipe;

threads formed on the external surface of the coupling body to mesh with said threads on said coupling nut;

a frusto-conical mouth formed on the end of the coupling body adjacent the insertion end of the pipe, meshing of said threads on said coupling nut with said threads on the coupling body causing said frusto-conical mouth to engage said sealing means to compress said sealing means against said flange portion of said ferrule to form a fluid tight seal; and a gripping flange affixed to the coupling body to engage the end of said coupling nut when said threads on said coupling nut and on the coupling body have been meshed to a certain point, thereby limiting the compression of said sealing means and protecting said flange portion from unnecessary strains that could weaken or break the braze joint between said flange portion and the pipe.

10. A fitting as claimed in claim 9 and further comprising a fillet between said sleeve portion and said flange portion to aid in securing proper deformation of said sealing means by directing said sealing means outwardly along said flange portion to bear against the inner surface of said coupling nut to form a stronger radial seal.

11. A fitting as claimed in claim 9 wherein said retaining means comprises a plurality of inwardly extending protrusions formed at the end of said sleeve portion of said ferrule adjacent the insertion end of the pipe.

12. A fitting as claimed in claim 9 wherein said retaining means comprises a plurality of threads disposed about the internal circumference of said sleeve portion of said ferrule.

* * * * *

UNITED STATES PATENT AND TRADEMARK OFFICE
CERTIFICATE OF CORRECTION

PATENT NO. : 3,848,905
DATED : November 19, 1974
INVENTOR(S) : Hammer et al.

It is certified that error appears in the above-identified patent and that said Letters Patent are hereby corrected as shown below:

Column 1, line 63, delete the entire line.
Column 2, line 25, delete the word "diamebTer" and substitute therefor--diameter--.
Column 7, line 10, delete the word "contaminats" and substitute therefor--contaminants--;
line 39, delete the word "sbt" and substitute therefor--set--.
Column 8, line 37, delete the word "fluidtight" and substitute therefor--fluid-tight--.

Column 9, line 61, delete the word "casuing" and substitute therefor--causing--.
Column 10, line 8, after the word said insert the words--deformable sealing--.

Signed and Sealed this

Tenth Day of April 1979

[SEAL]

Attest:

RUTH C. MASON
Attesting Officer

DONALD W. BANNER
Commissioner of Patents and Trademarks